US011343052B2

(12) United States Patent
Ye et al.

(10) Patent No.: US 11,343,052 B2
(45) Date of Patent: May 24, 2022

(54) CELL SPECIFIC REFERENCE SIGNAL (CRS) MUTING FOR EVEN FURTHER ENHANCED MACHINE TYPE COMMUNICATION (EFEMTC)

(71) Applicant: Apple Inc., Cupertino, CA (US)

(72) Inventors: Qiaoyang Ye, San Jose, CA (US); Debdeep Chatterjee, San Jose, CA (US); Salvatore Talarico, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 268 days.

(21) Appl. No.: 16/487,226

(22) PCT Filed: Mar. 22, 2018

(86) PCT No.: PCT/US2018/023769
§ 371 (c)(1),
(2) Date: Aug. 20, 2019

(87) PCT Pub. No.: WO2018/175724
PCT Pub. Date: Sep. 27, 2018

(65) Prior Publication Data
US 2021/0226760 A1 Jul. 22, 2021

Related U.S. Application Data

(60) Provisional application No. 62/476,012, filed on Mar. 24, 2017, provisional application No. 62/476,590, filed on Mar. 24, 2017.

(51) Int. Cl.
*H04L 5/00* (2006.01)
(52) U.S. Cl.
CPC .......... *H04L 5/0073* (2013.01); *H04L 5/0007* (2013.01); *H04L 5/0046* (2013.01); *H04L 5/0051* (2013.01)

(58) Field of Classification Search
CPC ... H04L 5/0001; H04L 5/0003; H04L 5/0005; H04L 5/0007; H04L 5/0046;
(Continued)

(56) References Cited

U.S. PATENT DOCUMENTS

2012/0027110 A1* 2/2012 Han .................... H04L 27/2656
375/260
2012/0113917 A1* 5/2012 Gaal .................... H04L 5/0058
370/329
(Continued)

FOREIGN PATENT DOCUMENTS

WO 2016/071010 A1 5/2016

OTHER PUBLICATIONS

International Preliminary Report on Patentability dated Sep. 24, 2019 for International Application No. PCT/US2018/023769.
(Continued)

*Primary Examiner* — Kevin D Mew
(74) *Attorney, Agent, or Firm* — Eschweiler & Potashnik, LLC

(57) ABSTRACT

A network device such as an evolved NodeB (eNB) or next generation NodeB (gNB) can configure a set of user equipment (UE) for cell reference signal (CRS) muting in order to provide better channel quality and power efficiency in communications. Where an eNB mutes CRS transmissions that are not needed by any UE, an improvement in downlink throughput and reduce connection drop rate can be generated. A CRS muting capability can be determined based on a user equipment (UE) capability information. According to the CRS muting capability of a UE, CRS muting can be generated in a physical channel outside of a narrow band (NB) or a wide band (WB) plus/minus X physical resource blocks (PRBs), wherein X is a non-negative integer, based on the CRS muting capability.

25 Claims, 7 Drawing Sheets

(58) Field of Classification Search
CPC ... H04L 5/0048; H04L 5/0051; H04L 5/0058; H04L 5/0073; H04L 5/0078; H04L 5/0082; H04L 5/0083; H04L 5/0085
See application file for complete search history.

(56) References Cited

U.S. PATENT DOCUMENTS

| | | | |
|---|---|---|---|
| 2012/0213095 A1* | 8/2012 | Krishnamurthy | H04L 5/001 370/252 |
| 2012/0275400 A1* | 11/2012 | Chen | H04J 11/0033 370/329 |
| 2013/0083753 A1 | 4/2013 | Lee et al. | |
| 2013/0188531 A1* | 7/2013 | Zhang | H04L 5/0048 370/280 |
| 2013/0196675 A1* | 8/2013 | Xiao | H04W 24/08 455/452.1 |
| 2013/0223332 A1* | 8/2013 | Wu | H04L 5/0032 370/315 |
| 2013/0265955 A1* | 10/2013 | Kim | H04W 72/04 370/329 |
| 2013/0344909 A1* | 12/2013 | Davydov | H04L 1/003 455/501 |
| 2014/0045510 A1* | 2/2014 | Yue | H04L 5/0057 455/450 |
| 2014/0204853 A1* | 7/2014 | Ko | H04L 5/0035 370/329 |
| 2014/0233518 A1* | 8/2014 | Lee | H04W 72/082 370/329 |
| 2015/0029874 A1* | 1/2015 | Davydov | H04W 24/08 370/252 |
| 2015/0078272 A1* | 3/2015 | Kim | H04L 5/0053 370/329 |
| 2015/0110064 A1* | 4/2015 | Hammarwall | H04B 17/382 370/330 |
| 2015/0131560 A1* | 5/2015 | Von Elbwart | H04W 72/042 370/329 |
| 2015/0223245 A1* | 8/2015 | Cheng | H04J 11/0069 370/329 |
| 2015/0349937 A1* | 12/2015 | Kim | H04L 5/0057 370/252 |
| 2016/0043843 A1* | 2/2016 | Liu | H04L 5/0048 370/329 |
| 2016/0119099 A1* | 4/2016 | Kim | H04L 5/0048 370/329 |
| 2016/0197690 A1* | 7/2016 | Li | H04B 1/48 370/278 |
| 2016/0302174 A1 | 10/2016 | Chatterjee et al. | |
| 2016/0315740 A1* | 10/2016 | Yi | H04L 5/005 |
| 2016/0330011 A1* | 11/2016 | Lee | H04L 5/0066 |
| 2017/0033907 A1* | 2/2017 | Guan | H04W 48/16 |
| 2017/0034731 A1* | 2/2017 | Lee | H04L 5/0073 |
| 2017/0311177 A1* | 10/2017 | Sarkissian | H04W 16/28 |
| 2019/0141696 A1* | 5/2019 | Kim | H04L 5/1469 |
| 2019/0342819 A1* | 11/2019 | Kadiri | H04W 48/16 |
| 2021/0045123 A1* | 2/2021 | Yavuz | H04W 4/70 |

OTHER PUBLICATIONS

International Search Report dated Jun. 6, 2018 for International Application No. PCT/US2018/023769.
"Frequency domain CRS muting for efeMTC." Source: Intel Corporation. Agenda Item: 7.2.6.4. 3GPP TSG RAN WG1 Meeting #88bis, Spokane, USA Apr. 3-7, 2017. R1-1704695.
"New WID on Even further enhanced MTC for LTE." Source: Ericsson, Qualcomm. Agenda Item: 10.1.1. 3GPP TSG RAN Meeting #75, Dubrovnik, Croatia, Mar. 6-9, 2017. RP-170465.
"Resource Allocation and DCI design for FeMTC." Source: Lenovo, Motorola Mobility. Agenda item: 7.2.3.1.1 3GPP TSG RAN WG1 Meeting #88, Athens, Greece, Feb. 13-18, 2017. R1-1702660.
LTE; "Evolved Universal Terrestrial Radio Access (E-UTRA)"; Physical layer procedures (3GPP TS 36.213 version 12.11.0 Release 12); ETSI TS 136 213 V12.11.0; Nov. 2016.

* cited by examiner

CELL SPECIFIC REFERENCE SIGNAL (CRS) MUTING FOR EVEN FURTHER ENHANCED MACHINE TYPE COMMUNICATION (EFEMTC)

REFERENCE TO RELATED APPLICATIONS

This application claims the benefit of U.S. Provisional Application No. 62/476,590 filed Mar. 24, 2017, entitled "DESIGN OF CRS MUTING FOR EVEN FURTHER ENHANCED MACHINE TYPE COMMUNICATION (EFEMTC)", and the benefit of U.S. Provisional Application No. 62/476,012 filed Mar. 24, 2017, entitled "DESIGN OF CRS MUTING FOR EVEN FURTHER ENHANCED MACHINE TYPE COMMUNICATION (EFEMTC)", the contents of which are herein incorporated by reference in their entirety.

FIELD

The present disclosure relates to wireless technology, and more specifically to techniques for employing cell specific reference signal (CRS) muting for Machine Type Communication (MTC), especially even further enhanced MTC (EFEMTC) communications.

BACKGROUND

Wireless mobile communication technology uses various standards and protocols to transmit data between a node (e.g., a transmission station) and a wireless device (e.g., a mobile device), or a user equipment (UE). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the access node can be an Evolved Universal Terrestrial Radio Access Network (E-UTRAN) Node Bs (also commonly denoted as evolved Node Bs, enhanced Node Bs, eNodeBs, or eNBs) with or without one or more Radio Network Controllers (RNCs), which can communicate with the UE. The DL transmission can be a communication from an access point/node or base station (e.g., a macro cell device, an eNodeB, an eNB, WiFi node, or other similar network device) to the UE, and the UL transmission can be a communication from the wireless network device to the node.

Additionally, the Internet of Things (IoT) is beginning to grow significantly, as consumers, businesses, and governments recognize the benefit of connecting devices to the internet. A significant segment of this industry is intended to operate over vast areas under the initiative low-power wide-area networking (LP-WAN), which is supposed to provide a global solution for both licensed and unlicensed spectrum. The following cellular technologies recently standardized in 3GPP are meant to operate in licensed spectrum: enhanced coverage global system for mobile communication (GSM) based on general packet radio service (GPRS) standard in the context of Rel-13; the evolution of the LTE machine type communication (eMTC) solution (commonly called Cat M1) which is based on an evolution of the legacy Cat 0; and narrowband (NB) IOT, a new non backward compatible radio access technology which is specifically optimized in order to satisfy the requirements required for typical IoT solutions (commonly called Cat NB1), such as with enhanced MTC (eMTC). Other category and above technologies can include further enhanced MTC (FeMTC), even further enhanced MTC (efeMTC/EFEMTC) or the like.

In LTE networks, minimizing the inter-cell interference, or inter-Radio Access Technology (RAT) interference, for example, can help increase the chances that downlink higher order modulation (e.g., 64QAM, 256QAM) can be utilized to increase the downlink throughput for users experiencing good coverage conditions. Cell reference signal (CRS) muting, where an eNB or network device mutes one or more CRS transmissions that are not needed by a UE, has been shown to improve downlink throughput and reduce connection drop rate.

DETAILED DESCRIPTION

Figure 1:
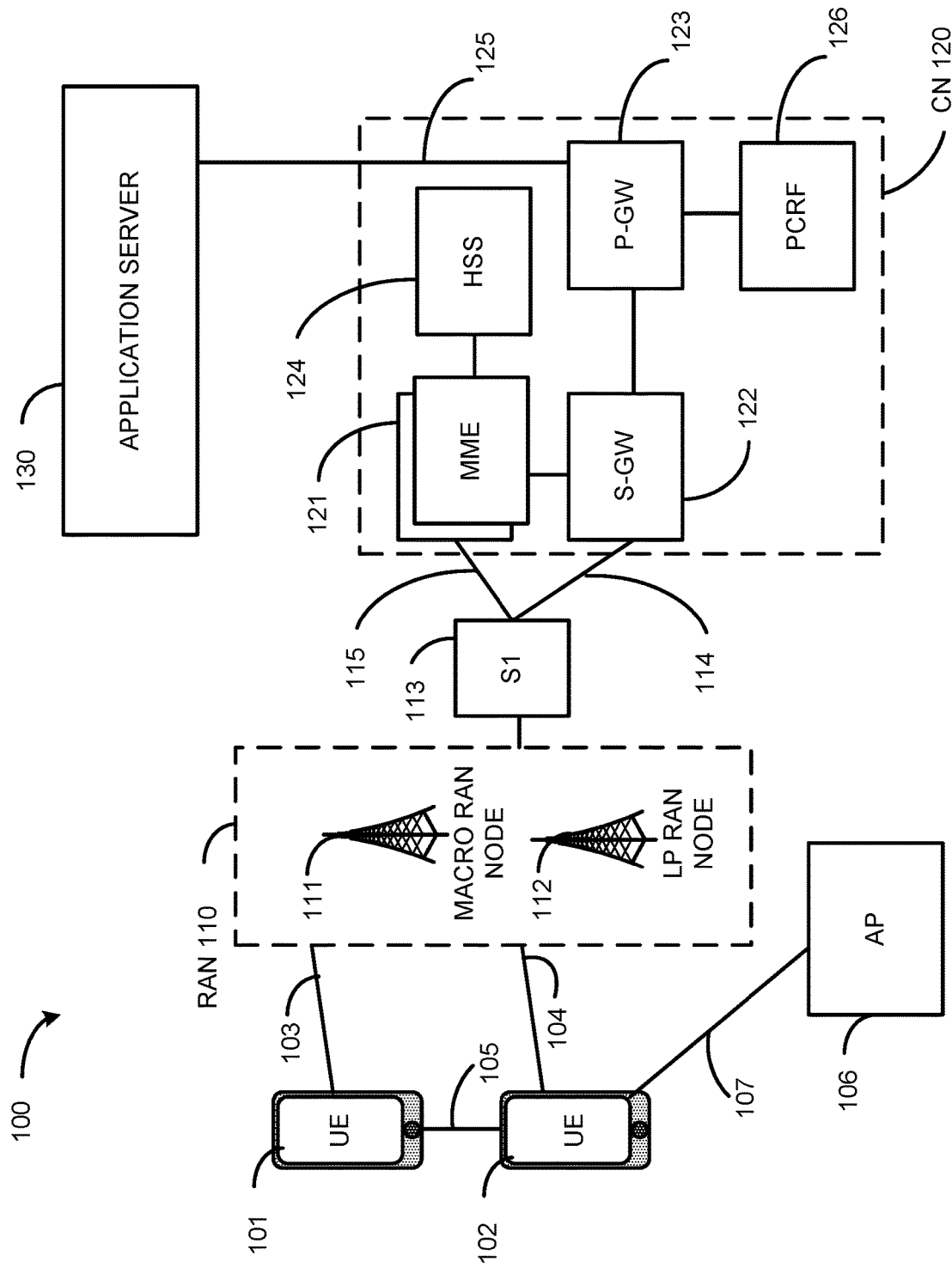
FIG. 1 is a block diagram illustrating an example user equipments (UEs) in a network with network components useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate vialocal and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In consideration of various deficiencies or solutions described herein, various embodiments/aspects are disclosed for network components to generate and process CRS muting in a physical channel for better signal quality and power efficiency. In particular, for UEs utilizing even further enhanced Machine Type Communication (efeMTC), especially in bandwidth reduced (BR) low-complexity (BL) UEs, additional frequency domain CRS muting is possible if eNB can assume that the UE does not rely on CRS outside its narrowband (NB) (for Cat-M1) or wideband (WB) (for Cat-M2). In LTE networks, minimizing the inter-cell interference can help increase the chances that downlink higher order modulation (64QAM, 256QAM) can be utilized to increase the downlink throughput for users experiencing good coverage conditions. Time domain CRS muting, where an eNB mutes CRS transmissions that are not needed by any UE, has been shown to improve downlink throughput and reduce connection drop rate. For BL UEs, additional frequency domain CRS muting is possible if eNB can assume that the UE does not rely on CRS outside its narrowband (for Cat-M1) or wideband (for Cat-M2).

In embodiments, an objective of efeMTC related to CRS muting is to utilize capability signaling for support for CRS muting outside BL UE NB/WB by enabling BL UEs to indicate CRS capability via a UE capability information. The BL UE can indicate that it does not rely on CRS outside its narrowband/wideband +/−X PRBs. The motivation for this proposal is to mute some reference symbols to save network power and reduce inter-cell or inter-RAT (e.g. NR) interference. CRS muting can be applied to BL UEs only. In current eMTC or feMTC systems, though a UE declares itself as a BL UE, it can still utilize wideband transmission of CRS to improve its channel estimation and time-frequency tracking if it is actually able to receive larger bandwidth. Thus, CRS transmission in wider bandwidth is preferred to improve UE performance. Embodiments herein provide the design of the configuration of CRS muting, and the value of parameter X for CRS muting in BL UEs for efeMTC.

Additional aspects and details of the disclosure further described below with reference to figures.

Embodiments described herein can be implemented into a system using any suitably configured hardware and/or software. FIG. 1 illustrates an architecture of a system 100 of a network in accordance with some embodiments. The system 100 is shown to include a user equipment (UE) 101 and a UE 102, which can be a BL UEs according to 3GPP Release 15 or beyond, for example with efeMTC. The UEs 101 and 102 are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface. As discussed herein, the UEs 101 and 102 can be communicatively coupled to networks of network devices 111, 112 (e.g., an HST (HSR) LTE network, a public LTE network (or non-station network), or other network, such as a boarding station network or the like).

In some embodiments, any of the UEs 101 and 102 can comprise an Internet of Things (IoT) UE or MTC devices, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 can include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block intereaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced the control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the EPC network 123 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
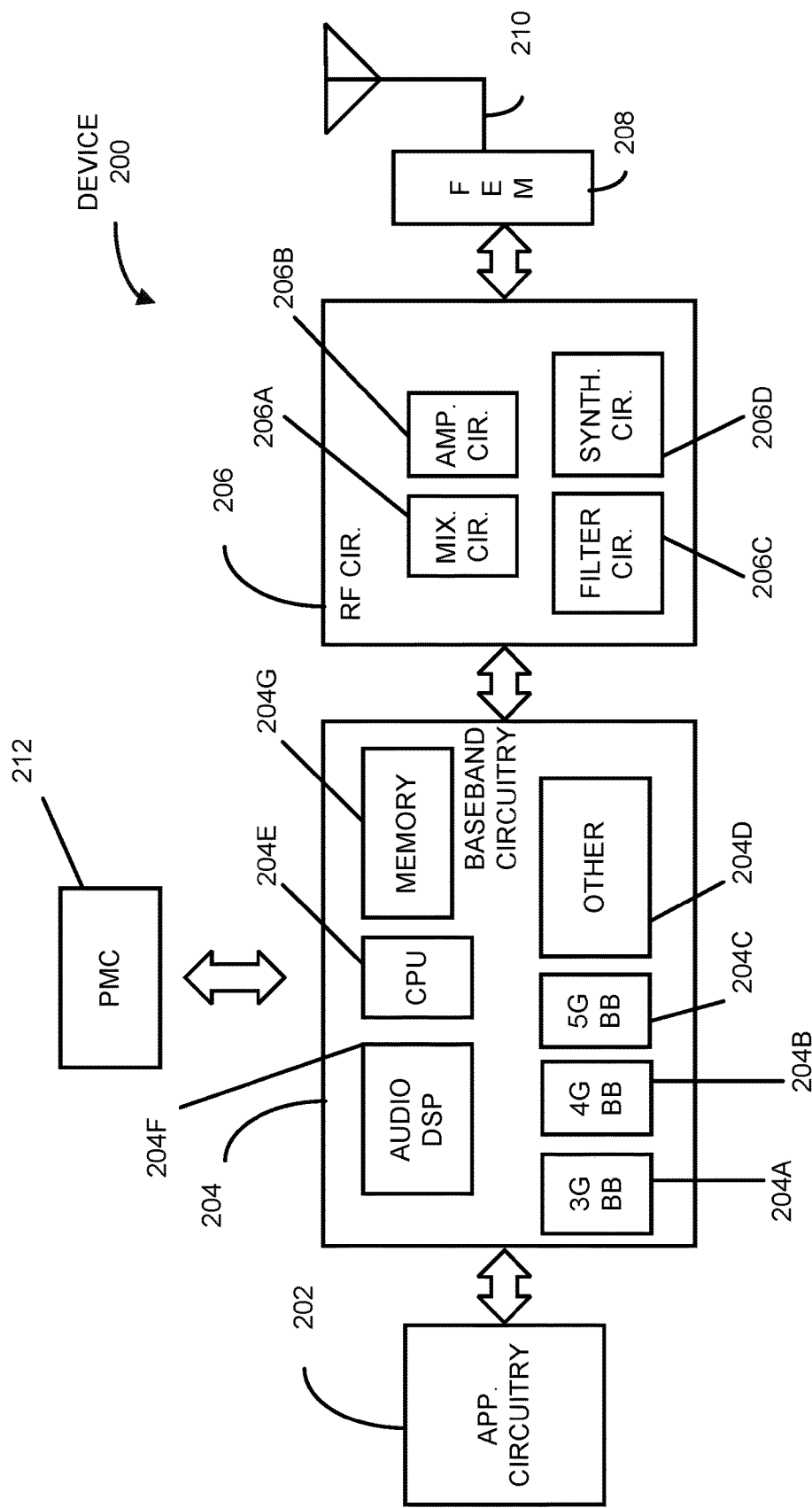
FIG. 2 is a diagram illustrating example components of a device that can be employed in accordance with various aspects discussed herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some embodiments, the device 200 can include less elements (e.g., a RAN node cannot utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tailbiting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In addition, the memory 204G (as well as other memory components discussed herein, such as memory 430, memory 530 or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected (RRC_CONNECTED) state (e.g., as an RRC_CONNECTED UE), where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_IDLE state (e.g., as an RRC_IDLE UE), where it disconnects from the network and does not perform operations such as channel quality feedback, handover, etc. The device 200 goes into a very low power state and it performs paging where again it periodically wakes up to listen to the network and then powers down again. The device 200 cannot receive data in this state, in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node.

Figure 3:
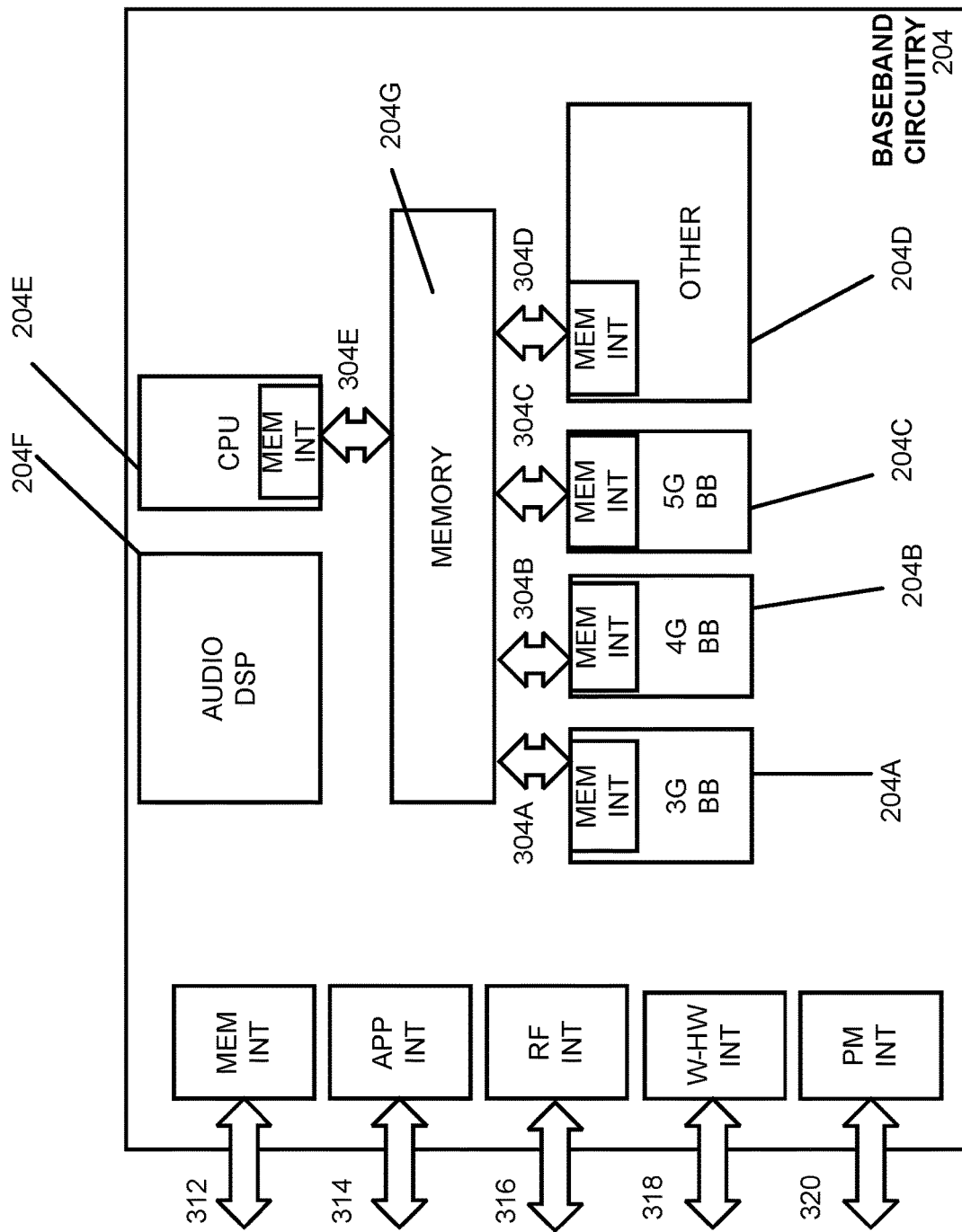
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
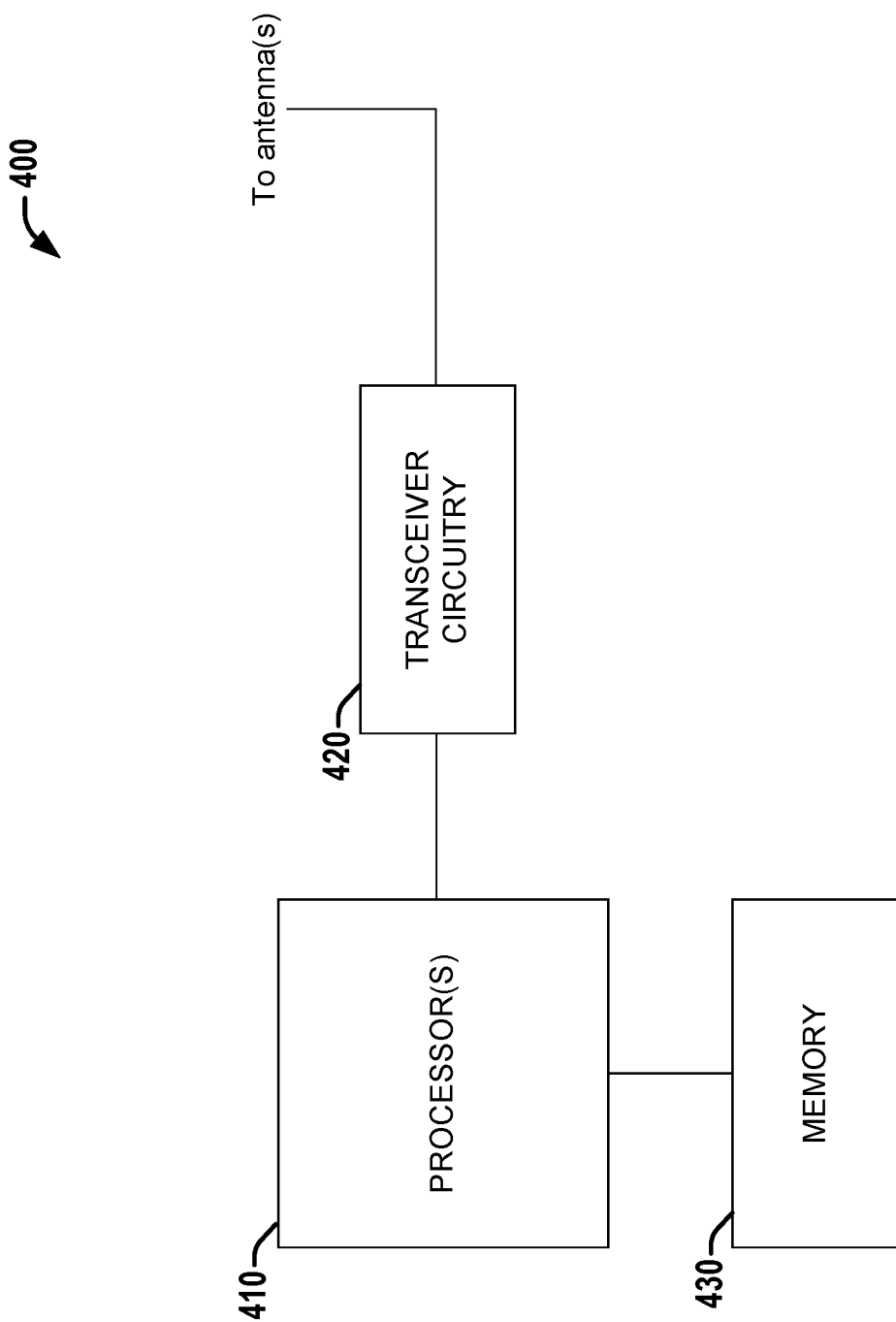
FIG. 4 is a block diagram illustrating a system or device employable at a UE that enables cell reference signal (CRS) muting according to various aspects described herein.

Referring to FIG. 4, illustrated is a block diagram of a system 400 employable at a UE or other network device (e.g., MTC, efeMTC, IoT device) that facilitates/enables CRS muting for BL UEs for efeMTC according to various aspects described herein. System 400 can include one or more processors 410 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE).

In various aspects discussed herein, signals and/or messages can be generated and output for transmission, and/or transmitted messages can be received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor(s) 510, etc.) can comprise one or more of: identifying physical resources associated with the signal/message, detecting the signal/message, resource element group deintereaving, demodulation, descrambling, and/or decoding.

Figure 5:
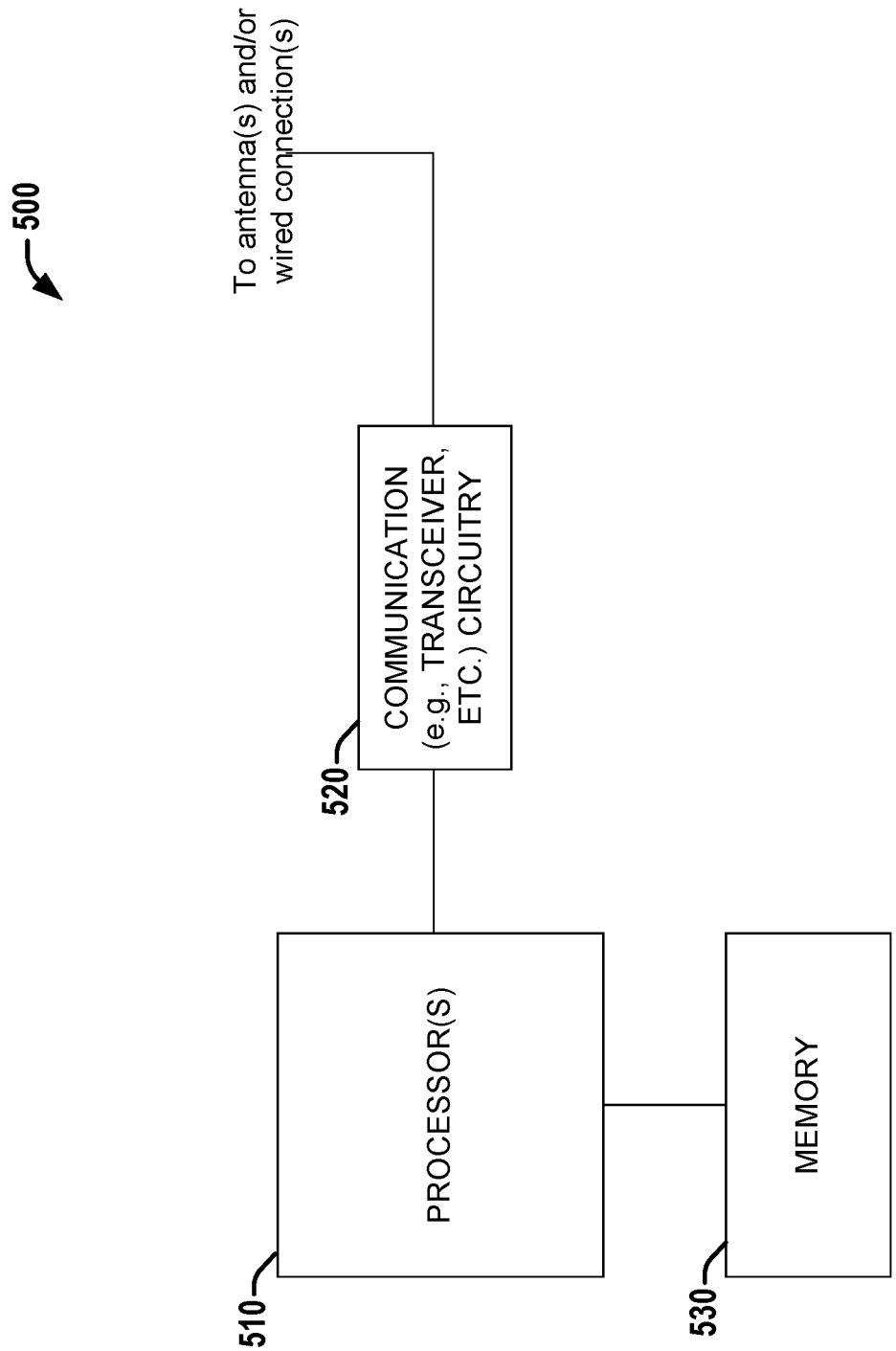
FIG. 5 is a block diagram illustrating a system or device employable at an eNB/gNB or other base station that enables cell reference signal (CRS) muting according to various aspects described herein.

Referring to FIG. 5, illustrated is a block diagram of a system 500 employable at a Base Station (BS), eNB, gNB or other network device that can enable CRS muting to increase channel quality and power communication efficiency. System 500 can include one or more processors 510 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture. As described in greater detail below, system 500 can enable the configuration of UE(s) for CRS muting.

In various embodiments, CRS muting can be processed via one or more processors 410 and transmissions generated based on the CRS muting received via transceiver circuitry 420. The UE 400 can be configured to generate UE capability information with the UEs capability for the support of CRS muting. This capability, for example, can be generated via the processor(s) 410 and transmitted to a cell network or eNB/gNB (e.g., system 500 of FIG. 5) in a UE capability information element (e.g., a ueCapability information, or the like).

The processor(s) 410 of the UE 400 can be configured to process CRS as muted outside its narrowband (NB)/wideband (WB), with plug/minus an X number of physical resource blocks (PRBs). An NB can be defined, for example, similarly as in Release 13 (e.g., TS 36.213 or other 3GPP TS) for enhanced machine type communication (eMTC). The NB can be non-overlapped or non-overlapping with one another while occupying different numbers of NBs for different system BW. For example, there can be about 1 NB for a system BW of about 1.4 MHz, about four NBs total for bandwidth of about 5 MHz, 8 NBs for system BW of 15 MHz, and 16 NBs for system BW of about 20 MHz, for example. The WB can comprise non-overlapping or overlapping bandwidths in terms of NBs comprising the WB, and each WB can consist of 4 NBs.

The processor(s) 410 of the UE 400 can process CRS muting semi-statically via a higher layer signaling based on one or more CRS muting configuration parameters. The CRS muting configuration parameters can be cell-specific at least in part or entirely, as well as UE-specific at least in part or entirely. For example, cell-specific CRS muting configuration parameters can be received and processed via the master information block (MIB)/system information block (SIB) of a physical layer channel (e.g., the physical broadcast channel (PBCH) for MIB and PDSCH for SIB), while any UE-specific cell configuration muting parameters via a UE-dedicated radio resource control (RRC) signaling. The CRS muting configuration parameters can include a set of subframes where the CRS is muted (or un-muted), as well as a set of PRBs/NBs/WBs where the CRS is muted (or un-muted).

In one example, the processor(s) 410 of the UE 400 can process an indication from the eNB or associated cell that comprises a bitmap or directly via a resource index (e.g., subframe/PRB/NB/WB/index(es)) in order to derive the CRS muting configuration parameters for CRS muting processing.

In another aspect, CRS muting can be enabled/disabled via data control information (DCI). In this way, a mechanism similar to the semi-persistent scheduling mechanisms can be used to activated/deactivate CRS muting via the DCI, which can be in addition to RRC signaling of the CRS muting configuration parameters for indication of the CRS muting configuration. The CRS muting configuration parameters or activation/deactivation thereof.

In an example, the DCI format can be reused from the DCI format 6-0A or DCI format 6-1A. In particular, one or more special fields can be used for activation/deactivation that can follow Table 9.2-1B and 9.2-1C in TS 36.213, respectively, in which an additional or further Radio Network Temporary Identifier (RNTI) can be utilized.

Alternatively, or additionally, in another example the DCI format 0 can be reused, in which a semi-persistent scheduling (SPS) cell RNTI (SPS-C-RNTI) used to designate the CRS muting configuration parameters, or activation/deactivation. Validation fields of the DCI format 0 can set based on Table 9.2-1 and 9.2-1A in TS 36.213 for activation and release, respectively.

The Tables discussed above are reproduced below for ease of reference.

TABLE 9.2-1

Special fields for Semi-Persistent Scheduling Activation PDCCH/EPDCCH Validation

| | DCI format 0 | DCI format 1/1A | DCI format 2/2A/2B/2C/2D |
|---|---|---|---|
| TPC command for scheduled PUSCH | set to '00' | N/A | N/A |
| Cyclic shift DM RS | set to '000' | N/A | N/A |
| Modulation and coding scheme and redundancy version | MSB is set to '0' | N/A | N/A |
| HARQ process number | N/A | FDD: set to '000' TDD: set to '0000' | FDD: set to '000' TDD: set to '0000' |
| Modulation and coding scheme | N/A | MSB is set to '0' | For the enabled transport block: MSB is set to '0' |
| Redundancy version | N/A | set to '00' | For the enabled transport block: set to '00' |

TABLE 9.2-1A

Special fields for Semi-Persistent Scheduling Release PDCCH/EPDCCH Validation

| | DCI format 0 | DCI format 1A |
|---|---|---|
| TPC command for scheduled PUSCH | set to '00' | N/A |
| Cyclic shift DM RS | set to '000' | N/A |
| Modulation and coding scheme and redundancy version | set to '11111' | N/A |
| Resource block assignment and hopping resource allocation | Set to all '1's | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | Set to all '1's |

TABLE 9.2-1B

Special fields for Semi-Persistent Scheduling Activation MPDCCH Validation

| | DCI format 6-0A | DCI format 6-1A |
|---|---|---|
| HARQ process number | set to '000' | FDD: set to '000' TDD: set to '0000' |
| Redundancy version | set to '00' | set to '00' |
| TPC command for scheduled PUSCH | set to '00' | N/A |
| TPC command for scheduled PUCCH | N/A | set to '00' |

TABLE 9.2-1C

Special fields for Semi-Persistent Scheduling Release MPDCCH Validation

| | DCI format 6-0A | DCI format 6-1A |
|---|---|---|
| HARQ process number | set to '000' | FDD: set to '000' TDD: set to '0000' |
| Redundancy version | set to '00' | set to '00' |
| Repetition number | set to '00' | set to '00' |
| Modulation and coding scheme | set to '1111' | set to '1111' |
| TPC command for scheduled PUSCH | set to '00' | N/A |
| Resource block assignment | Set to all '1's | Set to all '1's |

The CRS muting configuration parameters can include subframes with CRS or CRS resources/symbols that is muted. Aperiodicity can be included that further indicates the set of subframes with CRS muting, in which the set of subframes that are muted can be within each period of the periodicity. In one example, a set of CRS muting subframes within the period can be indicated in terms of a number of subframes, or via a bitmap with an $i^{th}$ bit indicating if the CRS is muted in an $i^{th}$ subframe within the period.

Further, the DCI being processed by processor(s) 410 of the UE 400 can include a part of the CRS muting configuration or CRS muting configuration parameters while RRC can signal other CRS muting configuration parameters. For example, a set of frequency domain resources where the CRS is muted can be signaled in activation DCI and the set of subframes where CRS is muted may be signaled by RRC.

For example, bits other than the validation bits, or bits in fields used for validation of data in DCI can be used for an indication of CRS configuration or related parameters. Alternatively, or additionally, a less number of validation bits can be used for validation and remaining bits in the total number of bits can be used for the indication of the CRS configuration or related parameters, for example.

In other aspects, CRS muting also can take into account or be dependent on non-BL UEs, frequency hopping of MPDCCH/PDSCH transmissions, and BL UEs in both RRC_IDLE mode and RRC_CONNECTED mode, respectively. In as much, the processor(s) 410 of the UE 400 processing data from the transceiver circuitry 420 can determine that a portion of PRBs/NBs/WBs within a range outside of a central core set of PRBs/NBs/WBs are not CRS muted.

For example, the processor(s) 410 can process the subframes received in a physical channel with CRS muting based on a central six PRBs with plus/minus Y PRBs not being muted, in which Y can be from one side or each side of the PRBs/NBs/WBs (e.g., two times Y), where Y can be a non-negative integer. In an aspect, the processor(s) 410 can take into account during processing that the physical channel that CRS is not muted when the subframes and corresponding PRBs carry system information for the bandwidth reduced UE (e.g., in system information block 1 bandwidth reduced (SIB1-BR)).

Regarding frequency domain resources in particular, the CRS could not be muted for the whole system BW, or the central 6 PRBs plus/minus Y PRBs and the NBs for SIB transmission plus/minus Y PRBs. In particular, the SIB1-BR and other SIBs can be sent on NBs other than the central 6 PRBs.

As referenced herein, plus/minus can refer to before, after, during or any combination thereof with respect to the variable or parameter that it modifies. For example, plus/minus Y PRBs can be PRBs before the central six PRBs, after the central six PRBs, during the central six PRBs, or any combination thereof.

In one example, Y can be any integer number or non-negative integer number, including, for example, Y=0, 3, or 6. When Y is a large number, this can imply that CRS is not muted via the whole system bandwidth. In particular, Y can be predefined, or be configured via RRC signaling to the UE 400 to process CRS accordingly.

In other related aspects, Y can depend on a maximum bandwidth (BW) supported by the UE in the cell, which the processor(s) 410 can generate/indicate in the UE capability information, for example. For example, if the UE 400 supports a maximum BW of 5 MHz, then 6 PRBs plus 2(Y) or two times Y PRBs could be larger than the 5 MHz. The 6 PRBs plus/minus (+/−) Y can be interpreted as 6 PRBs plug Y PRBs at each side of the 6 PRBs, as an example.

In other aspects, a set of subframes that the CRS is never muted can be the subframes containing the MIB/SIB-BR, every valid DL subframe, or N subframes before, after, during or a combination of the MIB/SIB-BR, as well as (or plus) the subframes carrying the MIB/SIB-BR. N can also be any non-negative integer, which can be predefined or received via signaling that is processed by the processor(s) 410, for example. In an example, the processor(s) 410 can derive from communication from the eNB 500 which time resources or frequency resources that the CRS is going to be muted, via MIB/SIB, or a UE-dedicated RRC signaling in the configuration or CRS muting configuration parameters, of the CRS muting.

In other embodiments, CRS muting could not be supported for a system BW of no more than Z, where Z can be 1.4 MHz, 3 MHz, or 5 MHz. For example, CRS muting could be supported only for the system BW larger than Z MHz, where Z can be 5 MHz.

Other embodiments of the UE 400 can take into account whether the UE is in an RRC connected mode, as an RRC_CONNECTED UE, or in an RRC idle mode, as an RRC_IDLE UE.

For example, if the UE 400 is in an RRC_IDLE mode and camped on a cell of an eNB then the processor(s) 400 could not be configured to process the CRS muting. Alternatively, the UE 400 could support CRS muting in RRC_IDLE modes.

For an RRC_CONNECTED UE, various embodiments can be implemented depending on the subframes being processed by the UE 400.

For subframes where the UE monitors Enhanced Machine-Type Communication (eMTC) Physical Downlink Control Channel (MPDCCH) without reception of PDSCH, the CRS can be muted outside of the NB for the MPDCCH monitoring plus/minus X PRBs, if the max PDSCH BW is configured to be 1.4 MHz. Alternatively, or additionally, if the maximum PDSCH BW if configured to be 5 MHz, the frequency resources outside of which WB covering MPDCCH monitoring resources plus/minus X PRBs can be muted, where the WB can be defined as the WB starting from or ending at the NB for MPDCCH monitoring (i.e., as overlapping WB) or the non-overlapping WB that includes the NB for MPDCCH monitoring. The maximum PDSCH bandwidth can also be processed as part of the UE capability information for the eNB to determine CRS muting configurations for the UE 400.

For subframes where the UE 400 receives the PDSCH, and the scheduled PDSCH transmission as well as the monitored MPDCCH NB fall within the maximum PDSCH BW, other CRS muting configurations or CRS muting configuration parameters of the CRS muting can be considered. For example, if there is only one NB or one WB that can cover both PDSCH and the MPDCCH region, the CRS can be muted outside of this NB/WB, plus/minus X PRBs. In another example, if the UE 400 is configured to have a maximum PDSCH BW of 5 MHz, and there are multiple WBs (in cases overlapped WB is defined) that can cover the MPDCCH and PDSCH region, the reference WB can be defined as the WB with the lowest index, the WB with the highest index, or the WB that starts from MPDCCH or scheduled PDSCH NB. The CRS outside the reference WB+/−X PRBs can be muted depending on the CRS muting configuration or the CRS muting parameters, including X as a non-negative integer.

For subframes where the UE 400 receives the PDSCH, and where the scheduled PDSCH transmission as well as the monitored MPDCCH NB do not fall within the max PDSCH BW other CRS muting configurations or CRS muting configuration parameters of the CRS muting can also be considered. For example, if the UE 400 is configured to have a maximum PDSCH BW of 1.4 MHz, the NB where the scheduled PDSCH transmission falls in can be the reference NB; The CRS can then be muted outside the reference NB plus/minus X PRBs, depending on CRS muting configuration or parameters (e.g., X). If UE is configured to have a maximum PDSCH BW of 5 MHz, the reference WB can be defined as the WB starting from the lowest NB allocated for PDSCH transmission, or the WB ending at the highest NB allocated for PDSCH, where the WB here is the overlapped WB in the system; The CRS can then be muted outside the reference WB+/−X PRBs, depending on CRS muting configuration.

In the time domain for one or more RRC_CONNECTED UEs, or for time domain resources related to CRS muting configuration parameters, various other aspects can be applied to the CRS muting configurations, related parameters in processing via the processor(s) 410 of the UE 400. In one example, CRS could not be muted in certain frequency region (depending on the options above for frequency domain muting configurations or patterns) in every valid DL subframe. In another example, CRS could not be muted in a certain frequency region (depending on the options above for frequency domain muting pattern) during at least one of: the valid subframes used to actually transmit MPDCCH, the subframes corresponding to an MPDCCH search space, or the subframes scheduled for PDSCH transmission.

Alternatively, or additionally, in the time domain for one or more RRC_CONNECTED UEs, the CRS is not muted in a certain frequency region (depending on the options above for frequency domain muting configurations or patterns related to monitoring the MPDCCH without or with reception of the PDSCH) N subframes after, before, during or a combination of the subframes that can carry MPDCCH (i.e., the subframes corresponding to an MPDCCH search space), or which are scheduled for PDSCH transmission. N can be any non-negative integer, which can be predefined or signaled by a higher layer signaling. This can be to further enable cross-subframe channel estimation for demodulation of MPDCCH/PDSCH.

In other embodiments, for RRC_IDLE UEs, when the UE 400 is in an RRC_IDLE UE camped on the cell of the eNB 500, for example, other aspects can be considered in processing CRS muting for the enhancement of power/signal quality or the like.

In an aspect, RRC_IDLE UEs 400 could not support CRS muting, for example. In this case, eNB needs to ensure there are no RRC_IDLE UEs when it mutes CRS.

In another aspect, the UE 400 as an RRC_IDLE UE can support CRS muting. Certain default NB/WB can be predefined/configured by signaling, where CRS can be muted outside the default NB/WB, plus/minus X PRBs. Here, some default NB(s)/WB(s) can be cell-specific, while some NB(s)/WB(s) can be UE-specific.

In another aspect, where the UE 400 (e.g., as a BL UE) supports a maximum channel BW of 5 MHz and is camping in the cell, the CRS could only be muted outside of a wideband (spanning 5 MHz, or about 24 or 25 PRBs), plus/minus X PRBs.

The default time/frequency resources where CRS is not muted can be cell-specific, where, for example, the NB/WB can include the central 6 PRBs, or central 6-PRB, plus/minus Y PRBs, as discussed above as well. Alternatively, or additionally, the default NB/WB can be UE-specific. The possible CRS muting frequency region for the UE 400 as an RRC_IDLE UE can depend on the NB where the UE monitors paging as provided in the examples below.

In the frequency domain, in particular, various examples can be utilized based on the UE 400 monitoring the paging or paging channel data. In one example, the processor(s) 410 can process the CRS as muted outside the NB for paging monitoring plus/minus X PRBs. In another example, if the UE 400 is configured with 5 MHz before it enters idle mode, the CRS can be muted outside the reference WB, plus/minus, X PRBs, where the reference WB can be the WB starting from or ending at the particular NB for paging monitoring (i.e., as an overlapped WB), or as a non-overlapped WB which would then include the NB for paging monitoring.

In the time domain, in particular, various examples can be utilized based on the UE 400 monitoring the paging or paging channel data also. In one example, the CRS can be processed by the UE 400 (or generated by the eNB 500) as not being muted in a certain frequency region (depending on the options above for frequency domain muting pattern) in every valid DL subframe.

Alternatively, or additionally, the CRS could not be muted in a certain frequency region (depending on the options above for frequency domain muting pattern) N subframes before, after, during the paging occasion, as well as subsequent subframes used to carry the paging DCI (in MPDCCH) and the subframes used to carry the paging record (in PDSCH). N can be any non-negative integer, which can be predefined or signaled by higher layer.

In aspects/embodiments herein, the CRS muting outside of PRBs/NBs/WBs, plus/minus X PRBs can be interpreted as CRS is not muted in the PRBs/NBs/WBs and additional X PRBs at the two sides of the PRBs/NBs/WBs, i.e. the considered resources (PRB(s)/NB(s)/WB(s)) in addition to 2(X)/2x(X) PRBs in total, for example. In an aspect, when the considered PRB(s)/NB(s)/WB(s) are at the system band edge, all the above examples can be extended to CRS muting outside the considered PRB(s)/NB(s)/WB(s) in addition to X PRBs at the side within the system bandwidth, or can be extended to CRS muting outside the considered PRB(s)/NB(s)/WB(s)) in addition to 2(X) PRBs at the side within the system bandwidth, for example.

In other additional embodiments, the design of the one or more CRS muting configurations or the CRS muting configuration parameters X (or any of the other non-negative integers as discussed herein, such as N, Y, Z or the like) can be implemented (generated by the eNB 500 or processed by the UE 400) according to various aspects of examples below.

For example, X as a non-negative integer can be predefined. As such, X can be predefined regardless of a maximum uplink (UL) or downlink (DL) channel BW that is supported by the UE. In one example, X can be 0, 3, 6, 9 or 12 PRBs, but is not limited to any specific non-negative integer.

In another example, the CRS muting configuration parameter X can be indicated by eNB 500. In one embodiment, the RRC signaling for configuration of CRS muting can include the value of X. In another embodiment, the DCI activating the CRS muting can indicate the value of X. Alternatively, or additionally, system information can include the value of X. A set of predefined X values can be defined, and the signaling only indicates the index of the value within the predefined set. For example, for set {0, 3, 6, 12}, 2 bits are needed for the indication. Alternatively, the absolute value of X can be indicated. For example, for system BW of 20 MHz and a BL UE with max 1 NB channel BW, 7 bits may be used for indication, e.g. from set {0, 1, . . . , 94}.

Alternatively, or additionally, in other aspects, X (or other parameter herein) can be defined as a function of a maximum PDSCH channel BW, or maximum physical uplink shared channel (PUSCH) channel BW, or both. In an aspect, X can be defined as a function of the maximum of the max PDSCH channel BW across all UEs in the cell 500, for example. In another aspect, X can be a function of only a maximum PDSCH channel BW of the UE indicating its capability in the UE capability information for support of the CRS muting. For example, the function can be X=ceil(A*$N_{DL}$) or floor(A*$N_{DL}$), where $N_{DL}$ is the max PDSCH channel BW supported by the UE 400, for example, and A can be a real number (e.g., A=0, 1, 0.5, 2, or other real number). In another embodiment, X can be a function of only a maximum PUSCH channel BW of the UE 400 indicating its capability in the UE capability information for support of CRS muting. For example, the function can be $X=A*N_{UL}$, where $N_{UL}$ is the maximum PUSCH channel BW supported by the UE 400, and A is a real number (e.g., A=0, 1, 0.5, 2, or other real number). Alternatively, or additionally, X can be a function of both a maximum PDSCH and PUSCH channel BW of the UE 400 indicating its capability in a UE capability information for support of CRS muting. For example, the function can be $X=A*\max\{N_{DL}, N_{UL}\}$, where $N_{DL}$ and $N_{UL}$ are the maximum PDSCH channel BW and maximum PUSCH channel BW supported by the UE 400, respectively, and A is a real number (e.g., A=0, 1, 0.5, 2, or other real number).

Alternatively, or additionally, in other aspects, X can be a function of a number of PRBs where the UE 400 monitors MPDCCH that can be based on the MPDCCH PRB-set configuration in MPDCCH common search space (CSS) (=6 PRBs) or MPDCCH UE search space (USS), or be a function of a number of PRBs allocated for PDSCH/PUSCH. Similar to aspects above, the function can be $X=A*N$ as one example, where N can be a number of PRBs where the UE 400 monitors MPDCCH, or the number of PRBs allocated for PDSCH/PUSCH transmission, or the number of PRBs spanning the frequency domain region that covers the PRBs for MPDCCH monitoring and PDSCH reception. A can be a real number (e.g., A=0, 1, 0.5, 2, or other real number). The parameter A as proposed here and above herein can be predefined, or indicated by the eNB 500, for example via/by RRC signaling or DCI enables the CRS muting.

In a first set of summary examples to the various aspects/embodiments herein, the below examples are envisioned as herein below, as also described above.

Example 1 may include the system and method of supporting CRS muting in certain frequency resource in efeMTC.

Example 2 may include the method of example I or some other example herein, wherein CRS muting may be configured via RRC signaling or RRC+SPS like mechanism, depending on UE capability.

Example 3 may include the method of example I or some other example herein, wherein CRS is not muted in central 6 PRBs+/−Y PRBs for certain or all SFs, and CRS muting may depend on PSS/SSS/MIB/SIB transmission.

Example 4 may include the method of example I or some other example herein, wherein CRS may be muted outside NB/WB+/−X PRBs for a RRC_CONNECTED UE, where NB/WB depends on NB for MPDCCH monitoring and scheduled PD SCH resources.

Example 5 may include the method of example I or some other example herein, wherein CRS may not be muted for RRC_IDLE UEs, or may be muted outside a predefined/configured NB/WB+/−X PRBs.

Example 6 may include the method of example I or some other example herein, wherein CRS is not muted in certain frequency region in every valid DL subframe, or N subframes before and during subframes which may carry MPDCCH or scheduled for PDSCH transmission.

Example 7 may include the method of example I or some other example herein, wherein X may be predefined, or configured, or be a function of max PDSCH and/or PUSCH channel BW, or be a function of number of PRBs for MPDCCH monitoring or PDSCH reception.

Example 8 may include an apparatus comprising means to perform one or more elements of a method described in or related to any of examples 1-7, or any other method or process described herein.

Example 9 may include one or more non-transitory computer-readable media comprising instructions to cause an electronic device, upon execution of the instructions by one or more processors of the electronic device, to perform one or more elements of a method described in or related to any of examples 1-7, or any other method or process described herein.

Example 10 may include an apparatus comprising logic, modules, or circuitry to perform one or more elements of a method described in or related to any of examples 1-7, or any other method or process described herein.

Example 11 may include a method, technique, or process as described in or related to any of examples 1-7, or portions or parts thereof.

Example 12 may include an apparatus comprising: one or more processors and one or more computer readable media comprising instructions that, when executed by the one or more processors, cause the one or more processors to perform the method, techniques, or process as described in or related to any of examples 1-7, or portions thereof.

Example 13 may include a method of communicating in a wireless network as shown and described herein.

Example 14 may include a system for providing wireless communication as shown and described herein.

Example 15 may include a device for providing wireless communication as shown and described herein.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases.

Figure 6:
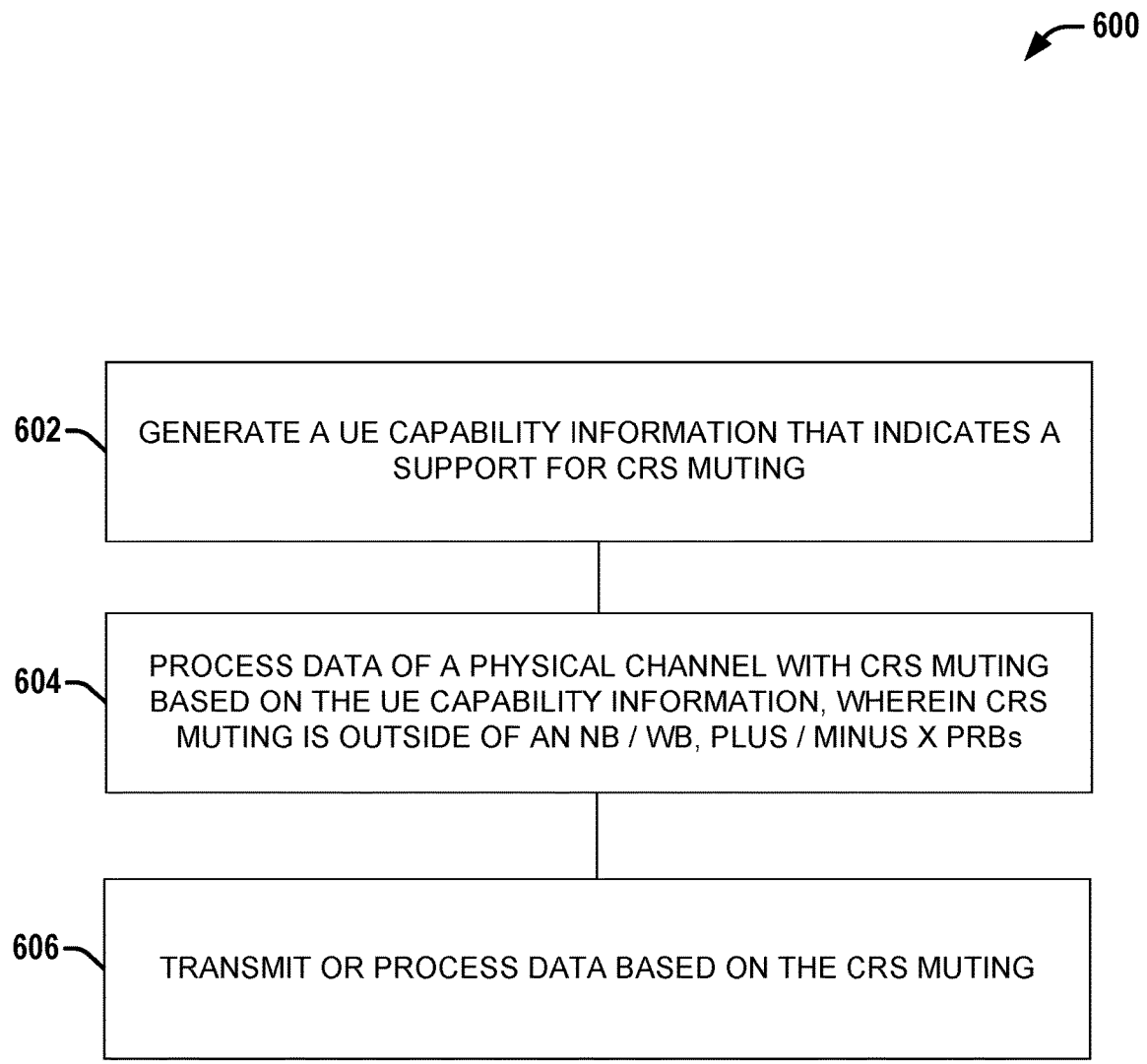
FIG. 6 is a flow diagram of an example method employable at a eNB/gNB that enables cell reference signal (CRS) muting according to various aspects described herein.

Referring to FIG. 6, illustrated is a flow diagram of an example method 600 employable at a UE (e.g., 400). The process flow 600 can initiate at 602 with processing circuitry configured to: generate a UE capability information that indicates a support for cell reference signal (CRS) muting. Support can be a level of support such as BW capability, or any of the CRS muting configuration parameters associated with the UEs signal processing and communication signaling.

At 604, the method further includes processing data of a physical channel with CRS muting based on the UE capability information, wherein the CRS muting is outside of a narrow band (NB) or a wide band (WB) plus/minus X physical resource blocks (PRBs), wherein X is a non-negative integer.

At 606, the method further includes transmitting or processing data based on the CRS muting.

In other embodiments, the method can include processing one or more CRS muting configuration parameters via at least one of: a master information block (MIB), a system information block (SIB), or a UE-dedicated radio resource control (RRC) signaling, wherein the one or more CRS muting configuration parameters include one or more of: cell-specific parameters or UE-specific parameters, comprising a set of CRS muted subframes, a set of PRBs, NBs, or WBs where CRS is muted. This can include processing one or more indications of the one or more CRS muting configuration parameters, wherein the one or more indications comprise a bitmap, a resource index, or a periodicity with a set of subframes with the CRS muting in a period of the periodicity. The one or more CRS muting configuration parameters can be process in one or more of: data control information (DCI) or the RRC signaling. These parameters can also include any parameters related to or identified in the Tables 9.2-1 thru 9.2.1C herein such as also cited in TS 36.213, for example.

In an example, an indication of the CRS muting can be processed that is only outside of a central six physical resource blocks (PRBs) plus/minus Y PRBs, wherein Y comprises a non-negative integer as the indication of the CRS muting that is only outside of the central six PRBs based on a maximum bandwidth supported in the UE capability information and relative to each side of the central six PRBs.

The processing circuitry can be further configured to process the CRS muting to be not muted for N subframes of at least one of: before, after or during monitored subframes of Enhanced Machine-Type Communication (eMTC) Physical Downlink Control Channel (MPDCCH) subframes that is outside of the NB for MPDCCH monitoring plus/minus the X PRBs, or outside of the NB for the monitored MPDCCH plus/minus the X PRBs in response to a maximum bandwidth (BW) of a Physical Downlink Shared Channel (PDSCH) being about 1.4 MHz, and outside of the WB plus/minus the X PRBs in response to the maximum BW of the PDSCH being about 5 MHz where the WB includes or does not include the NB. The above acts can also apply to PDSCH that comprises unicast PDSCH or PDSCH carrying one or more SIBs also, for example.

In response to receiving the PDSCH, wherein the PDSCH received and the MPDCCH are outside of the maximum BW of the PDSCH, if the maximum PDSCH BW is about 1.4 MHz, the NB comprises a reference NB located at the PDSCH transmission, and if the maximum PDSCH BW is about 5 MHz, the WB comprises a reference WB starting from a lowest NB allocated for the PDSCH or ending at a highest NB allocated for the PDSCH, wherein the WB comprises an overlapping WB or the WB covering the PDSCH scheduled frequency resources if WB is defined in a non-overlapped way.

The CRS muting can be kept from being generated within a frequency region of N subframes of at least one of: before, after or during MPDCCH subframes or scheduled PDSCH subframes, based on one or more criteria, wherein the one or more criteria comprise at least one of: each valid downlink subframe, or subframes related to MPDCCH transmission, an MPDCCH search space, or a PDSCH transmission, wherein N comprises a non-negative integer.

Figure 7:
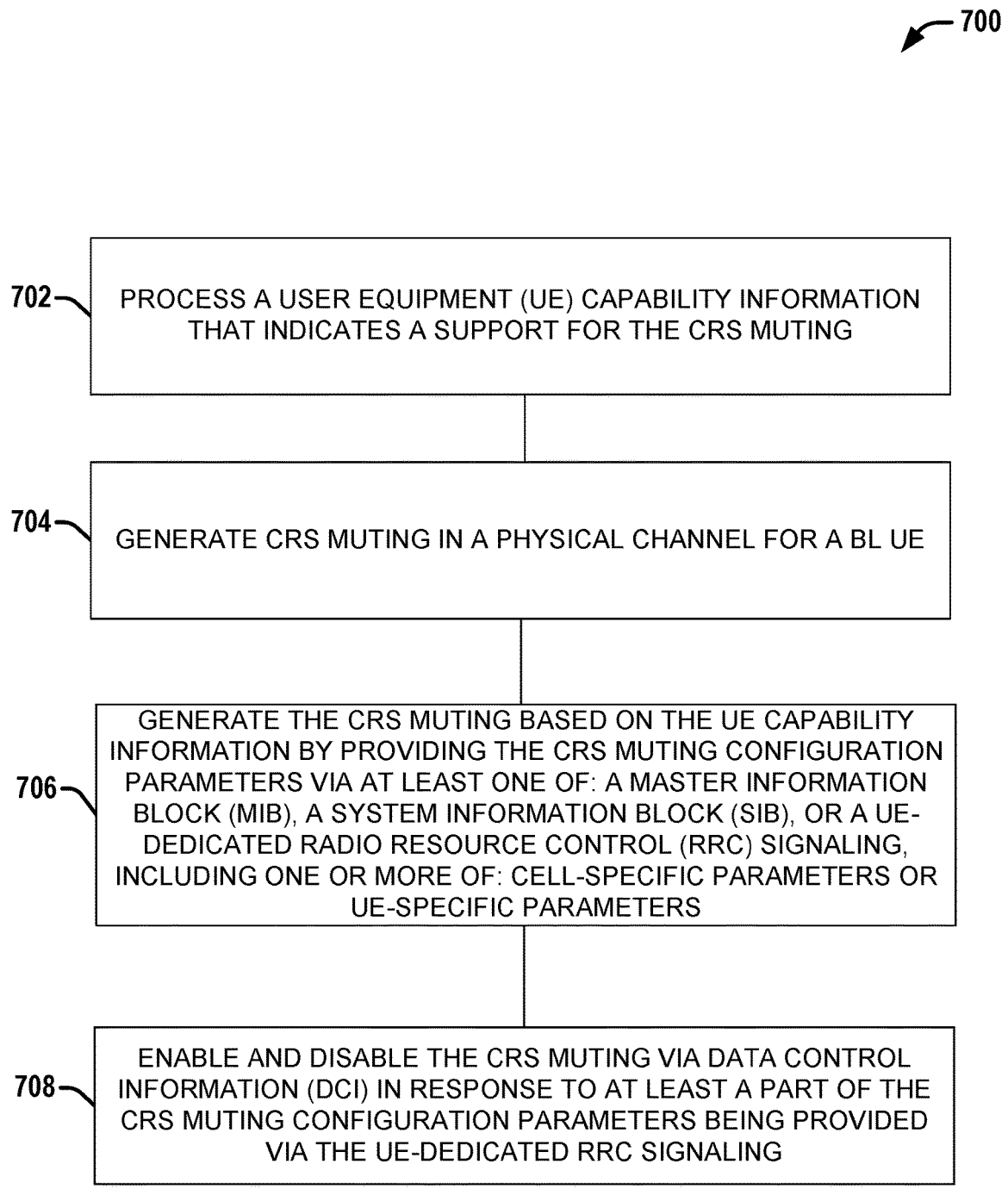
FIG. 7 is a flow diagram of an example method employable at a UE that enables cell reference signal (CRS) muting.

Referring to FIG. 7, illustrated is a flow diagram of an example method 700 employable at a gNB/eNB. The process flow 700 can initiate at 702 with processing a UE capability information that indicates a support for the CRS muting. The support can include one or more capability parameters for a BL UE, including BW, frequency, NB configuration, WB configuration, a set of subframes where the CRS is muted (or un-muted), as well as a set of PRBs/NBs/WBs where the CRS is muted (or un-muted), or any other parameters discussed or referenced herein.

At 704, the process flow 700 further comprises generating a CRS muting in a physical channel to a BL UE. The CRS muting is generated outside of a narrow band (NB) or a wide band (WB) plus/minus X physical resource blocks (PRBs), wherein X is a non-negative integer, based on a CRS muting capability.

At 706, the eNB/gNB (e.g., 500) can generate the CRS muting based on the UE capability information by providing the CRS muting configuration parameters via at least one of: a master information block (MIB), a system information block (SIB), or a radio resource control (RRC) signaling (e.g., a UE dedicated RRC signaling), which can include one or more of: cell-specific parameters or UE-specific parameters.

At 708, the CRS muting can be enabled, disabled, or both sequentially, via a DCI in response to at least a part of the CRS muting configuration parameters being provided via the UE-dedicated RRC signaling.

In other embodiments, the one or more of the CRS muting configuration parameters or CRS muting resources can be activated/deactivated via data control information (DCI) via/with a radio network temporary identified (RNTI) for the CRS muting or by reusing a semi persistent scheduling cell RNTI (SPS-C RNTI) with a DCI format 0 used for activation/deactivation of the CRS muting.

The eNB/gNB (e.g., 500) can further determine the cell reference signal (CRS) muting capability based on a user equipment (UE) capability information. The CRS muting can be generated, for example, as only outside of a central six physical resource blocks (PRBs) plus/minus Y PRBs, wherein Y comprises a non-negative integer, based on a bandwidth (BW) indicated by the UE capability information or Y can be predefined.

For subframes of one or more RRC_CONNECTED UEs to monitor Enhanced Machine-Type Communication (eMTC) Physical Downlink Control Channel (MPDCCH) without reception of physical downlink shared channel (PDSCH), the CRS can be muted outside of the NB for MPDCCH monitoring plus/minus X PRBs. For subframes of the one or more RRC_CONNECTED UEs monitored with reception of the PDSCH, muting the CRS can be based on a number of NBs or WBs that cover a PDSCH region and the NB configured for MPDCCH monitoring.

Muting the CRS for one or more RRC_IDLE UEs with the NB or the WB plus/minus X PRBs can also be based on a NB configured paging monitoring for frequency domain resources or a paging occasion for time domain resources. The X can be predefined, or is a function of at least one of: a configured maximum PDSCH BW before UE goes to RRC_IDLE mode, a configured physical uplink shared channel (PUSCH) BW before UE goes to RRC_IDLE mode, a number of PRBs scheduled for MPDCCH monitoring or a number of PRBs allocated for PDSCH reception.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantumdot based transistors, switches and gates, in order to optimize space usage or enhance performance of mobile devices. A processor can also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

In a second set of examples for the various aspects/embodiments herein, the below examples are envisioned as herein below, as also described above.

Example 1 can be an apparatus configured can be be employed in an evolved Node B (eNB), comprising: processing circuitry configured to: generate a cell reference signal (CRS) muting based on CRS muting configuration parameters; and a radio frequency (RF) interface, configured to provide, to RF circuitry, data for transmission related to the CRS muting.

Example 2 can include Example 1, wherein the processing circuitry is further configured to: process a user equipment (UE) capability information that indicates a support for the CRS muting; and generate the CRS muting based on the UE capability information by providing the CRS muting configuration parameters via at least one of: a master information block (MIB), a system information block (SIB), or a UE-dedicated radio resource control (RRC) signaling, including one or more of: cell-specific parameters or UE-specific parameters.

Example 3 can include the subject matter of any one of Examples 1-2, wherein the processing circuitry is further configured to enable and disable the CRS muting via data control information (DCI) in response to at least a part of the CRS muting configuration parameters being provided via the UE-dedicated RRC signaling.

Example 4 can include the subject matter of anyone of Examples 1-3, wherein the DCI comprises a DCI format including at least one of: DCI format 6-0A, DCI format 6-1A, or DCI format 0, and the processing circuitry is further configured to indicate a set of subframes with the CRS muting based on the CRS muting configuration parameters comprising a periodicity and the set of subframes within a period of the periodicity according to: a number of subframes or a bitmap corresponding to one or more subframes of the set of subframes.

Example 5 can include the subject matter of any one of Examples 1-4, wherein the processing circuitry is further configured to generate the CRS muting configuration parameters in one or more of: an RRC or a DCI, wherein the CRS muting configuration parameters comprises one or more of: one or more frequency domain resources where a CRS is muted, or one or more indications of a set of subframes where the CRS is muted.

Example 6 can include the subject matter of anyone of Examples 1-5, wherein the processing circuitry is further configured to generate the CRS muting only outside of a central six physical resource blocks (PRBs) plus/minus Y PRBs on each side of the central six PRBs, wherein Y comprises a non-negative integer.

Example 7 can include the subject matter of any one of Examples 1-6, wherein the processing circuitry is further configured to generate an indication of a set of subframes with CRS that will not be muted.

Example 8 can include the subject matter of anyone of Examples 1-7, wherein the processing circuitry is further configured to generate the CRS muting by performing a determination of whether any RRC_IDLE UE that does not support the CRS muting is camped on a cell, and in response to the determination that no RRC_IDLE UE that does not support the CRS muting is camped on the cell, generating the CRS muting based on a narrowband (NB) or wideband (WB), plus/minus X PRBs, wherein X comprises a non-negative integer.

Example 9 can include the subject matter of anyone of Examples 1-8, wherein the processing circuitry is further configured to generate the CRS muting not within N subframes of at least one of: before, after or during monitored subframes of Enhanced Machine-Type Communication (eMTC) Physical Downlink Control Channel (MPDCCH) subframes outside of the NB for MPDCCH monitoring plus/minus the X PRBs, or outside of the NB for the monitored MPDCCH plus/minus the X PRBs in response to a maximum bandwidth (BW) of a Physical Downlink Shared Channel (PDSCH) being about 1.4 MHz, and outside of the WB plus/minus the X PRBs in response to the maximum BW of the PDSCH being about 5 MHz where the WB includes the NB configured for MPDCCH monitoring.

Example 10 can include the subject matter of anyone of Examples 1-9, wherein the processing circuitry is further configured to keep the CRS muting outside a frequency region not within N subframes of at least one of: before, after or during MPDCCH monitoring subframes or PDSCH scheduled subframes, based on one or more criteria, wherein the one or more criteria comprise at least one of: each valid downlink subframe, subframes related to MPDCCH transmission, an MPDCCH search space, or a PDSCH transmission, wherein N comprises a non-negative integer.

Example 11 can include the subject matter of any one of Examples 1-10, wherein the processing circuitry is further configured to generating the CRS muting to an RRC_IDLE UE being camped to the cell outside of the NB, or the WB, plus/minus the X PRBs, wherein the NB or WB includes frequency resources configured for paging monitoring, and time domain resources where CRS is not muted is based on one or more paging criteria of the UE monitored paging region comprises N subframes of at least one of: before, after, or during a paging occasion, wherein N is a non-negative integer.

Example 12 can include the subject matter of anyone of Examples 1-11, wherein the processing circuitry is further configured to indicate X via RRC, DCI or a system information, in response to X not being predefined; in response to X being a predefined set of values, indicate an index value within the predefined set of values or an absolute value; indicate X as a function of at least one of: a configured maximum PDSCH BW or a configured maximum PUSCH BW; or indicate X as a function of a number of PRBs allocated for a PDSCH, a PUSCH, or an MPDCCH.

Example 13 is an apparatus configured to be employed in a user equipment (UE), comprising: processing circuitry configured to: generate a UE capability information that indicates a support for cell reference signal (CRS) muting; and process data of a physical channel with CRS muting based on the UE capability information, wherein the CRS muting is outside of a narrow band (NB) or a wide band (WB) plus/minus X physical resource blocks (PRBs), wherein X is a non-negative integer; and a radio frequency (RF) interface, configured to provide, to RF circuitry, data for transmission based on the CRS muting.

Example 14 can include the subject matter of Example 13, wherein the processing circuitry is further configured to process one or more CRS muting configuration parameters via at least one of: a master information block (MIB), a system information block (SIB), or a UE-dedicated radio resource control (RRC) signaling, wherein the one or more CRS muting configuration parameters include one or more of: cell-specific parameters or UE-specific parameters, comprising a set of CRS muted subframes, a set of PRBs, NBs, or WBs where CRS is muted.

Example 15 can include the subject matter of anyone of Examples 13-14, wherein the processing circuitry is further configured to process one or more indications of the one or more CRS muting configuration parameters, wherein the one or more indications comprise a bitmap, a resource index, or a periodicity with a set of subframes with the CRS muting in a period of the periodicity, and process the one or more CRS muting configuration parameters in one or more of: data control information (DCI) or the RRC signaling.

Example 16 can include the subject matter of anyone of Examples 13-15, wherein the processing circuitry is further configured to process an indication of the CRS muting that is only outside of a central six physical resource blocks (PRBs) plus/minus Y PRBs, wherein Y comprises a non-negative integer as the indication of the CRS muting that is only outside of the central six PRBs based on a maximum bandwidth supported in the UE capability information and relative to each side of the central six PRBs.

Example 17 can include the subject matter of anyone of Examples 13-16, wherein the processing circuitry is further configured to process the CRS muting outside of the time resources that is N subframes of at least one of: before, after or during monitored subframes of Enhanced Machine-Type Communication (eMTC) Physical Downlink Control Channel (MPDCCH) subframes, and is outside of the NB for MPDCCH monitoring plus/minus the X PRBs, or outside of the NB for the monitored MPDCCH plus/minus the X PRBs in response to a maximum bandwidth (BW) of a Physical Downlink Shared Channel (PDSCH) being about 1.4 MHz, and outside of the WB plus/minus the X PRBs in response to the maximum BW of the PDSCH being about 5 MHz where the WB includes the NB for MPDCCH monitoring.

Example 18 can include the subject matter of Examples 13-17, wherein the processing circuitry is further configured to process the CRS muting outside of time resources that is N subframes of at least one of: before, after or during subframes scheduled for PDSCH reception, and is outside of the NB including PDSCH allocated frequency resources plus/minus the X PRBs in response to a maximum bandwidth (BW) of a Physical Downlink Shared Channel (PDSCH) being about 1.4 MHz, and outside of the WB including PDSCH allocated frequency resources plus/minus the X PRBs in response to the maximum BW of the PDSCH being about 5 MHz.

Example 19 can include the subject matter of Examples 13-18, wherein the processing circuitry is further configured to process the CRS muting outside of a frequency region of N subframes of at least one of: before, after or during MPDCCH subframes or scheduled PDSCH subframes, based on one or more criteria, wherein the one or more criteria comprise at least one of: each valid downlink subframe, or subframes related to MPDCCH transmission, an MPDCCH search space, or a PDSCH transmission, wherein N comprises a non-negative integer.

Example 20 can include the subject matter of Example 13-19, wherein the processing circuitry is further configured to process CRS muting for an RRC_IDLE UE where the CRS muting is outside of the frequency region with the NB configured for paging monitoring plus/minus X PRBs and N subframes of least one of: before, after or during a paging occasion configured to carry a paging DCI in MPDCCH and a paging record in PDSCH.

Example 21 is a computer readable storage medium storing executable instructions that, in response to execution, cause one or more processors of an evolved Node B (eNB) to perform operations comprising: generating a CRS muting in a physical channel wherein the CRS muting is generated outside of a narrow band (NB) or a wide band (WB) plus/minus X physical resource blocks (PRBs), wherein X is a non-negative integer, based on a CRS muting capability.

Example 22 can include the subject matter of Example 21, wherein the operations further comprise: providing a bitmap or a resource index indicating CRS muting configuration parameters comprising a set of CRS muted subframes, physical resource blocks (PRBs), NBs, or WBs where CRS is muted, via at least one of: a master information block (MIB), a system information block (SIB), or a radio resource control (RRC) signaling; or activating and deactivating one or more of the CRS muting configuration parameters or CRS muting resources via data control information (DCI) via a radio network temporary identified (RNTI) for the CRS muting or reusing a semi persistent scheduling cell RNTI (SPS-C RNTI) with a DCI format 0 used for activation/deactivation of the CRS muting.

Example 23 can include the subject matter of any one of Examples 21-22, wherein the operations further comprise: determining the cell reference signal (CRS) muting capability based on a user equipment (UE) capability information; and generating the CRS muting only outside of a central six physical resource blocks (PRBs) plus/minus Y PRBs, wherein Y comprises a non-negative integer, based on a bandwidth (BW) indicated by the UE capability information.

Example 24 can include the subject matter of any one of Examples 21-23, wherein the operations further comprise: for subframes of one or more RRC_CONNECTED UEs to monitor Enhanced Machine-Type Communication (eMTC) Physical Downlink Control Channel (MPDCCH) without reception of physical downlink shared channel (PDSCH), muting the CRS outside of the NB for MPDCCH monitoring or the WB including the NB for MPDCCH monitoring plus/minus X PRBs, based on a PDSCH bandwidth of the UE capability information; and for subframes of the one or more RRC_CONNECTED UEs monitored with reception of the PDSCH, muting the CRS based on a number of NBs or WBs that cover a PDSCH region and the NB configured for MPDCCH monitoring.

Example 25 can include the subject matter of any one of Examples 21-24, wherein the operations further comprise: muting the CRS for one or more RRC_IDLE UEs outside of the NB or the WB plus/minus X PRBs based on a NB configured for paging monitoring for frequency domain resources and N subframes of at least one of: before, after or during paging occasion for time domain resources.

Example 26 can include the subject matter of any one of Examples 21-25, wherein the X is predefined, or is a function of at least one of: a configured maximum PDSCH BW, a configured physical uplink shared channel (PUSCH) BW, a number of PRBs scheduled for MPDCCH monitoring or a number of PRBs allocated for PDSCH reception.

Example 27 can include an apparatus comprising means to perform one or more elements of a method described in or related to any of examples 1-26, or any other method or process described herein.

Example 28 can include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 29 may include an apparatus comprising logic, modules, or circuitry to perform one or more elements of a method described in or related to any of examples 1-26, or any other method or process described herein.

Example 30 may include a method, technique, or process as described in or related to any of examples 1-26, or portions or parts thereof.

Example 31 can include an apparatus comprising: one or more processors and one or more computer readable media comprising instructions that, when executed by the one or more processors, cause the one or more processors to perform the method, techniques, or process as described in or related to any of examples 1-26, or portions thereof.

Example 32 can include a method of communicating in a wireless network as shown and described herein.

Example 33 can include a system for providing wireless communication as shown and described herein.

Example 34 cam include a device for providing wireless communication as shown and described herein.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus configured to be employed in a base station, comprising:
    processing circuitry configured to:
        process a user equipment (UE) capability information that indicates a support for a cell reference signal (CRS) muting;
        provide CRS muting configuration parameters based on the UE capability information by via a system information block (SIB) or a UE-dedicated radio resource control (RRC) signaling, the CRS muting configuration parameters including cell-specific parameters or UE-specific parameters; and
        enable or disable the CRS muting based on the CRS muting configuration parameters.

2. The apparatus of claim 1, wherein the enabling or disabling of the CRS muting is via data control information (DCI) in response to at least a part of the CRS muting configuration parameters being provided via the UE-dedicated RRC signaling.

3. The apparatus of claim 2, wherein the DCI comprises a DCI format including at least one of: DCI format 6-0A, DCI format 6-1A, or DCI format 0, and the processing circuitry is further configured to indicate a set of subframes with the CRS muting based on the CRS muting configuration parameters comprising a periodicity and the set of subframes within a period of the periodicity according to: a number of subframes or a bitmap corresponding to one or more subframes of the set of subframes.

4. The apparatus of claim 1, wherein the processing circuitry is further configured to generate the CRS muting configuration parameters in one or more of: an RRC or a DCI, wherein the CRS muting configuration parameters comprises one or more of: one or more frequency domain resources where a CRS is muted, or one or more indications of a set of subframes where the CRS is muted.

5. The apparatus of claim 1, wherein the processing circuitry is further configured to generate the CRS muting only outside of a central six physical resource blocks (PRBs) plus / minus Y PRBs on each side of the central six PRBs, wherein Y comprises a non-negative integer.

6. The apparatus of claim 1, wherein the processing circuitry is further configured to generate an indication of a set of subframes with CRS that will not be muted.

7. The apparatus of claim 1, wherein the processing circuitry is further configured to generate the CRS muting by performing a determination of whether any RRC_IDLE UE that does not support the CRS muting is camped on a cell, and in response to the determination that no RRC_IDLE UE that does not support the CRS muting is camped on the cell, generating the CRS muting based on a narrowband (NB) or wideband (WB), plus/minus X PRBs, wherein X comprises a non-negative integer.

8. The apparatus of claim 7, wherein the processing circuitry is further configured to generate the CRS muting not within N subframes of at least one of: before, after or during monitored subframes of Enhanced Machine-Type Communication (eMTC) Physical Downlink Control Channel (MPDCCH) subframes outside of the NB for MPDCCH monitoring plus/minus the X PRBs, or outside of the NB for the monitored MPDCCH plus/minus the X PRBs in response to a maximum bandwidth (BW) of a Physical Downlink Shared Channel (PDSCH) being about 1.4 MHz, and outside of the WB plus/minus the X PRBs in response to the maximum BW of the PDSCH being about 5 MHz where the WB includes the NB configured for MPDCCH monitoring.

9. The apparatus of claim 7, wherein the processing circuitry is further configured to keep the CRS muting outside a frequency region not within N subframes of at least one of: before, after or during MPDCCH monitoring subframes or PDSCH scheduled subframes, based on one or more criteria, wherein the one or more criteria comprise at least one of: each valid downlink subframe, subframes related to MPDCCH transmission, an MPDCCH search space, or a PDSCH transmission, wherein N comprises a non-negative integer.

10. The apparatus of claim 7, wherein the processing circuitry is further configured to generating the CRS muting to an RRC_IDLE UE being camped to the cell outside of the NB, or the WB, plus/minus the X PRBs, wherein the NB or WB includes frequency resources configured for paging monitoring, and time domain resources where CRS is not muted is based on one or more paging criteria of the UE monitored paging region comprises N subframes of at least one of: before, after, or during a paging occasion, wherein N is a non-negative integer.

11. The apparatus of claim 7, wherein the processing circuitry is further configured to
indicate X via RRC, DCI or a system information, in response to X not being predefined;
in response to X being a predefined set of values, indicate an index value within the predefined set of values or an absolute value;
indicate X as a function of at least one of: a configured maximum PDSCH BW or a configured maximum PUSCH BW; or
indicate X as a function of a number of PRBs allocated for a PDSCH, a PUSCH, or an MPDCCH.

12. An apparatus configured to be employed in a user equipment (UE), comprising:
processing circuitry configured to:
generate a UE capability information that indicates a support for cell reference signal (CRS) muting; and
process data of a physical channel with CRS muting based on the UE capability information, wherein the CRS muting is outside of a narrow band (NB) or a wide band (WB) plus/minus X physical resource blocks (PRBs), wherein X is a non-negative integer; and
a radio frequency (RF) interface, configured to provide, to RF circuitry, data for transmission based on the CRS muting.

13. The apparatus of claim 12, wherein the processing circuitry is further configured to process one or more CRS muting configuration parameters via a system information block (SIB) or a UE-dedicated radio resource control (RRC) signaling, wherein the one or more CRS muting configuration parameters include cell-specific parameters or UE-specific parameters, comprising a set of CRS muted subframes, a set of PRBs, NBs, or WBs where CRS is muted.

14. The apparatus of claim 13, wherein the processing circuitry is further configured to process one or more indications of the one or more CRS muting configuration parameters, wherein the one or more indications comprise a bitmap, a resource index, or a periodicity with a set of subframes with the CRS muting in a period of the periodicity, and process the one or more CRS muting configuration parameters in data control information (DCI) or the RRC signaling.

15. The apparatus of claim 12, wherein the processing circuitry is further configured to process an indication of the CRS muting that is only outside of a central six physical resource blocks (PRBs) plus/minus Y PRBs, wherein Y comprises a non-negative integer as the indication of the CRS muting that is only outside of the central six PRBs based on a maximum bandwidth supported in the UE capability information and relative to each side of the central six PRBs.

16. The apparatus of claim 12, wherein the processing circuitry is further configured to process the CRS muting outside of the time resources that is N subframes of at least one of: before, after or during monitored subframes of Enhanced Machine-Type Communication (eMTC) Physical Downlink Control Channel (MPDCCH) subframes, and is outside of the NB for MPDCCH monitoring plus/minus the X PRBs, or outside of the NB for the monitored MPDCCH plus/minus the X PRBs in response to a maximum bandwidth (BW) of a Physical Downlink Shared Channel (PDSCH) being about 1.4 MHz, and outside of the WB plus/minus the X PRBs in response to the maximum BW of the PDSCH being about 5 MHz where the WB includes the NB for MPDCCH monitoring.

17. The apparatus of claim 12, wherein the processing circuitry is further configured to process the CRS muting outside of time resources that is N subframes of at least one of: before, after or during subframes scheduled for PDSCH reception, and is outside of the NB including PDSCH allocated frequency resources plus/minus the X PRBs in response to a maximum bandwidth (BW) of a Physical Downlink Shared Channel (PDSCH) being about 1.4 MHz, and outside of the WB including PDSCH allocated frequency resources plus/minus the X PRBs in response to the maximum BW of the PDSCH being about 5 MHz.

18. The apparatus of claim 12, wherein the processing circuitry is further configured to process the CRS muting outside of a frequency region of N subframes of at least one of: before, after or during MPDCCH subframes or scheduled PDSCH subframes, based on one or more criteria, wherein the one or more criteria comprise at least one of: each valid downlink subframe, or subframes related to MPDCCH transmission, an MPDCCH search space, or a PDSCH transmission, wherein N comprises a non-negative integer.

19. The apparatus of claim 12, wherein the processing circuitry is further configured to process CRS muting for an RRC_IDLE UE where the CRS muting is outside of the frequency region with the NB configured for paging monitoring plus/minus X PRBs and N subframes of least one of: before, after or during a paging occasion configured to carry a paging DCI in MPDCCH and a paging record in PDSCH.

20. A non-transitory computer readable storage medium storing executable instructions that, in response to execution, cause one or more processors of base station to perform operations comprising:
   generating a CRS muting in a physical channel wherein the CRS muting is generated outside of a narrow band (NB) or a wide band (WB) plus/minus X physical resource blocks (PRBs), wherein X is a non-negative integer, based on a CRS muting capability.

21. The non-transitory computer readable storage medium of claim 20, wherein the operations further comprise:
   providing a bitmap or a resource index indicating CRS muting configuration parameters comprising a set of CRS muted subframes, physical resource blocks (PRBs), NBs, or WBs where CRS is muted, via a system information block (SIB) or a radio resource control (RRC) signaling; or
   activating and deactivating one or more of the CRS muting configuration parameters or CRS muting resources via data control information (DCI) via a radio network temporary identified (RNTI) for the CRS muting or reusing a semi persistent scheduling cell RNTI (SPS-C RNTI) with a DCI format 0 used for activation/deactivation of the CRS muting.

22. The non-transitory computer readable storage medium of claim 20, wherein the operations further comprise:
   determining the cell reference signal (CRS) muting capability based on a user equipment (UE) capability information; and
   generating the CRS muting only outside of a central six physical resource blocks (PRBs) plus/minus Y PRBs, wherein Y comprises a non-negative integer, based on a bandwidth (BW) indicated by the UE capability information.

23. The non-transitory computer readable storage medium of claim 20, wherein the operations further comprise:
   for subframes of one or more RRC_CONNECTED UEs to monitor Enhanced Machine-Type Communication (eMTC) Physical Downlink Control Channel (MPDCCH) without reception of physical downlink shared channel (PDSCH), muting the CRS outside of the NB for MPDCCH monitoring or the WB including the NB for MPDCCH monitoring plus/minus X PRBs, based on a PDSCH bandwidth of the UE capability information; and
   for subframes of the one or more RRC_CONNECTED UEs monitored with reception of the PDSCH, muting the CRS based on a number of NBs or WBs that cover a PDSCH region and the NB configured for MPDCCH monitoring.

24. The non-transitory computer readable storage medium of claim 20, wherein the operations further comprise:
   muting the CRS for one or more RRC_IDLE UEs outside of the NB or the WB plus/minus X PRBs based on a NB configured for paging monitoring for frequency domain resources and N subframes of at least one of: before, after or during paging occasion for time domain resources.

25. The non-transitory computer readable storage medium of claim 20, wherein the X is predefined, or is a function of at least one of: a configured maximum PDSCH BW, a configured physical uplink shared channel (PUSCH) BW, a number of PRBs scheduled for MPDCCH monitoring or a number of PRBs allocated for PDSCH reception.

* * * * *

UNITED STATES PATENT AND TRADEMARK OFFICE
CERTIFICATE OF CORRECTION

PATENT NO. : 11,343,052 B2
APPLICATION NO. : 16/487226
DATED : May 24, 2022
INVENTOR(S) : Qiaoyang Ye et al.

It is certified that error appears in the above-identified patent and that said Letters Patent is hereby corrected as shown below:

In the Claims

In Claim 1, Column 32, Line 51: Please remove the word "by" which is between the word information and via.

In Claim 10, Column 33, Line 55: Please replace the word generating with generate.

In Claim 10, Column 33, Line 55: Please replace the word generating with generate.

In Claim 10, Column 33, Line 57: Please remove the "," after the word NB and or.

In Claim 10, Column 33, Line 57: Please remove the "," after the word WB and plus.

In Claim 10, Column 33, Line 59: Please remove the "," after the word monitoring and and.

In Claim 10, Column 33, Line 60: Please remove the word "is" between muted and based.

In Claim 10, Column 33, Line 60: Please replace the word the with a.

In Claim 10, Column 33, Line 61: Please replace the word compromises with compromising.

In Claim 16, Column 34, Line 51: Please remove the word "the" between of and time.

In Claim 19, Column 35, Line 18: Please remove the word "the" between of and frequency.

In Claim 20, Column 35, Line 27: Please remove the word "CRS" and replace with cell reference signal (CRS) .

In Claim 22, Column 36, Line 5: Please remove the word "CRS" and replace with cell reference signal (CRS).

Signed and Sealed this
Eleventh Day of October, 2022

Katherine Kelly Vidal
*Director of the United States Patent and Trademark Office*